United States Patent
Lam

(12) 
(10) Patent No.: US 6,396,327 B1
(45) Date of Patent: *May 28, 2002

(54) METHOD AND APPARATUS FOR REDUCING DISTORTION PRODUCED BY A NONLINEAR DEVICE

(75) Inventor: Daniel H. Lam, Oceanside, CA (US)

(73) Assignee: Tacan Corporation, Carlsbad, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/145,063

(22) Filed: Sep. 1, 1998

(51) Int. Cl.$^7$ .......................... H01J 29/56; H04B 10/00
(52) U.S. Cl. ................... 327/317; 327/306; 327/362; 359/161; 359/180; 330/149
(58) Field of Search ................... 327/362, 319, 327/513, 320, 133, 317, 306; 359/180; 330/149

(56) References Cited

U.S. PATENT DOCUMENTS 3,392,287 A * 7/1968 McFadyer et al. .......... 327/362
5,302,922 A * 4/1994 Heidemann et al. .......... 33/18
5,327,279 A 7/1994 Farina et al. ................ 359/180
5,402,044 A * 3/1995 Haferl ......................... 315/371
5,600,472 A * 2/1997 Uesaka ........................ 330/149

* cited by examiner

Primary Examiner—Dinh T. Le
(74) Attorney, Agent, or Firm—Brown Martin Haller & McClain, LLP

(57) ABSTRACT

A predistortion circuit (102) includes a signal splitter (114), a diode network (118) and a signal combiner (116). The signal splitter (114) is splits an input signal into two portions. One of the signal portions is passed through the diode network (118) and combined with the other portion of the input signal in the signal combiner (116). The diode network (118) includes a plurality of diode circuits (204,206), each including two diode branches (208–214) coupled to an electrical ground (220). The resulting predistorted signal at the output (106) of the signal combiner is amplified, amplitude adjusted and injected into the nonlinear device (112). The input signal is predistorted such that distortion due to nonlinear characteristics of the nonlinear device (112) is reduced.

12 Claims, 3 Drawing Sheets

METHOD AND APPARATUS FOR REDUCING DISTORTION PRODUCED BY A NONLINEAR DEVICE

BACKGROUND OF THE INVENTION

1. Field of the Invention

The present invention relates in general to reducing distortion produced by nonlinear devices and more specifically to a method and apparatus for predistorting an input signal to a nonlinear device to reduce nonlinear distortion.

2. Description of the Related Art

Many electrical and electro-optic devices have nonlinear characteristics that result in undesired distortion in an output signal. Optical communication systems are particularly susceptible to nonlinear distortion resulting in reduced performance. Communication systems use transmitters having signal modulators that modulate a desired signal onto a carrier signal before transmission. Optical communication systems commonly employ high power optical transmitters. For example, cable television broadcast networks use high power optical transmitters to transport multiple video channels through fiber optics for signal distribution. These transmitters typically utilize electro-optic intensity modulators to modulate an optical signal before transmission.

Electro-optic modulators are constructed by placing metal electrodes above and below an optical waveguide formed in a crystal. Lithium niobate ($LiNbO_3$) is most often used for the crystal although other materials may be used such as lithium tantalate ($LiTaO_3$). A desired signal is modulated onto these electrodes, and the electric field between the electrodes, in turn, modulates the crystal, changing its optical index of refraction in response to the input signal. As the refractive index changes, the light (typically from a continuous wave (CW) source laser) is modulated as it passes through the external modulator.

Electro-optic modulators have a sinusoidal transfer function of modulation voltage input (across the electrodes) in relation to light modulation output. Consequently, electro-optic modulators are nonlinear devices that generate undesired harmonics when a modulating signal is injected into the modulator.

The non-linear characteristic of electro-optic modulators is a problem in multichannel optical communication systems such as cable television (CATV) systems. In CATV systems, a large number of closely spaced carriers require linear operation of the system in order minimize intermodulation distortion.

One method of minimizing the harmonics includes operating the modulator symmetrically around a quadrature bias point. By injecting low level signals, the modulator can be operated in the near linear portion of the transfer function curve. As the amplitude of the modulation signal is increased, however, the harmonics due to the non-linear characteristics of the modulator increase significantly. As a result, the dynamic range of the modulator is significantly limited.

Other methods of reducing harmonics include "predistorting" the input signal prior to injection into the electro-optic modulator. These predistortion methods attempt to approximate an arcsine function that predistorts the RF input signal.

One such predistortion method, described in U.S. Pat. No. 5,168,534, discloses a linearization circuit that uses an electro-optic modulator as part of a predistortion circuit approximating the arcsine function. This attempt, however, requires that the phase and gain accuracy be tightly constrained. Further, this attempt is costly because two modulators are required.

Another predistortion method, described in U.S. Pat. No. 5,327,279, attempts to approximate the arcsine function using a diode pair to approximate a sine function and combining twice the input signal in an attempt to generate a 2(x)-sin(x) function. The diode pair only approximates a sine function and performance is limited.

Therefore, there exists a need for a method and apparatus for reducing the distortion produced by a non-linear device.

SUMMARY OF THE INVENTION

The present invention relates to a method and apparatus for reducing distortion due to characteristics of a nonlinear device.

In an embodiment of the present invention, a predistortion circuit includes a signal splitter, a diode network and a signal combiner. An input signal is split into two portions in the signal splitter. One of the signal portions is passed through a diode network and combined with the other portion of the input signal in the signal combiner. The diode network includes a plurality of diode circuits, each including two diode branches coupled to an electrical ground. The resulting predistorted signal at the output of the signal combiner is amplified, amplitude adjusted and injected into the nonlinear device. The input signal is predistorted such that distortion due to nonlinear characteristics of the nonlinear device is reduced.

BRIEF DESCRIPTION OF THE DRAWINGS

The present invention will be better understood from the following detailed description of a preferred embodiment of the invention, taken in conjunction with the accompanying drawings in which like reference numerals refer to parts and in which.

DESCRIPTION OF THE PREFERRED EMBODIMENT

Figure 1:
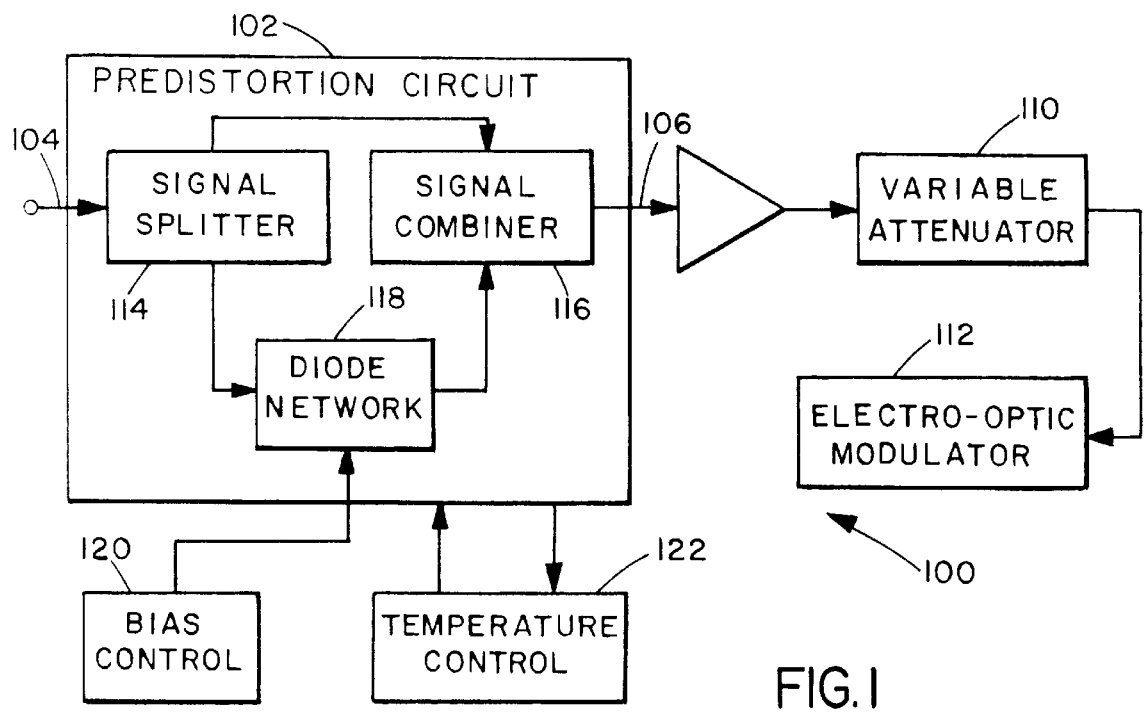
FIG. 1 is a block diagram of a transmitter in accordance with a preferred embodiment of the present invention.

FIG. 1 is block diagram of a transmitter 100 in accordance with a preferred embodiment of the present invention. A predistortion circuit 102 predistorts an input signal injected at the input 104. The predistorted signal produced at the output 106 of the predistortion circuit 102 is amplified in the amplifier 108. A variable attenuator 110 is used to adjust the amplitude of the predistorted signal into the electro-optic modulator 112.

Although the present invention may be used to reduce nonlinear distortion of different types of devices, the preferred embodiment of the invention compensates for non-linear characteristics of a electro-optic modulator 112. In the preferred embodiment, the electro-optic signal modulator 112 utilizes a lithium niobate ($LiNbO_3$) crystal. As discussed above, $LiNbO_3$ electro-optic modulators utilize metal electrodes placed above and below an optical wave guide. A desired signal is coupled onto the electrodes changing the optical index of refraction of the crystal. Light from a continuous wave (CW) source laser is modulated by the desired signal as it passes through the crystal. Optimum operation of the crystal requires that the signal modulator 104 (metal electrodes) be biased at a point of inflection of the signal modulator's 104 transfer function.

The predistortion circuit, which is discussed in more detail below in reference to FIG. 2, includes at least a signal splitter 114, a signal combiner 116 and a diode network 118 in addition to various attenuators and matching circuitry (not shown). The predistortion circuit 102 receives an input radio frequency (RF) signal at the input 104. The input signal is split in the signal splitter 114 producing a first portion of the input signal and a second portion of the input signal. The first portion of the input signal passes through the diode network 118 that, in the preferred embodiment, has a sinusoidal transfer function. The signal combiner 116 combines the first portion of the input signal and the predistorted second portion of the input signal produced at the output of the diode network 118 to produce the predistorted input signal. A 3 dB attenuator (not shown) is placed on the input and a second 3 dB attenuator (not shown) is placed on the output of the diode network 118 to provide the required proportional relationship between the first and second portions of the input signal to approximate an arcsine transfer function. In the preferred embodiment, the predistortion circuit 102 has a transfer function in accordance with an arcsine function in order to compensate for the sinusoidal transfer function of the electro-optic modulator 112. Therefore, since the RF input signal is predistorted with an arcsine transfer function by passing through the predistortion circuit 102 before it is modulated by the electro-optic modulator 112, distortion of the modulated light output of the electro-optic modulator 112 is reduced.

The amplifier 108 increases the amplitude of the predistorted signal in order to ensure an adequate signal level to the electro-optic modulator 112 and includes a wide band, low distortion amplifier, temperature varying attenuators and a fixed attenuator. The amplifier 108 is designed to maintain a constant gain over temperature by choosing temperature compensation attenuators having specific temperature coefficients using known techniques. The amplifier 108 has approximately 22dB of gain which is adjusted by choosing an appropriate fixed attenuator during the manufacturing process. The gain of the amplifier is determined from a desired input signal power level to the electro-optic modulator 112 and the output signal power level of the predistortion circuit 102. The desired input signal power level of the electro-optic modulator 112 is estimated using manufacturer provided test data of the electro-optic modulator 112. The equations for calculating the input power are as follows.

$$A_{rms} = \frac{OMI}{\Pi} \cdot V_{p-i} \frac{1}{\sqrt{2}}$$

$$P_i = 10 \log\left(\frac{A_{rms}^2}{50}\right) \times 30$$

Where OMI (optical-modulation index) is the ratio of the peak amplitude excursion of the intensity-modulated optical signal to the average power of the input signal;

$V_{p-i}$ is the half wave voltage required for the electro-optic modulator 112 to attain 100% (full on/off) modulation;

$A_{rms}$ is the root mean square (rms) of the desired input voltage; and $P_i$ is the estimated desired input signal power into the electro-optic modulator 112.

Preferably, a test circuit (not shown) is used to adjust the variable attenuator 110 and the bias voltage of the diode network during the manufacturing process of the predistortion circuit 102. In the preferred embodiment, the variable attenuator has 1 dB of attenuation and is adjustable in 0.1 dB increments. However, any attenuator having a sufficient number of attenuation steps may be used. The attenuator is adjusted such that the amplitude of the predistorted signal provides optimum performance of the electro-optic modulator 112. The amplitude of the predistorted signal is adjusted by setting attenuation of the variable attenuator 110 to reduce harmonics that result in the modulated light output of the electro-optic modulator 112. Preferably, the adjustment is made manually while observing the harmonic content of a signal spectrum of a demodulated output of the electro-optic modulator 112.

A bias control circuit 120 supplies bias to the diodes within the diode network 118. Preferably, the bias voltage is adjusted manually while observing the demodulated spectrum of the light output of the electro-optic modulator 112 during the manufacturing process using the test circuit. The bias voltage and the attenuation of the variable attenuator 110 are adjusted simultaneously or nearly simultaneously (alternating between the adjustments of each parameter), therefore the process of adjusting the attenuation and bias voltage may require several iterations.

In an alternate embodiment, the attenuation of the variable attenuator is dynamically adjusted during operation of the transmitter 100. The demodulated output of the electro-optic modulator 112 is monitored using digital signal processing techniques. A controller or microprocessor dynamically adjusts the amplitude of the predistorted signal by controlling the attenuation of the variable attenuator using control signals. In the alternate embodiment, the controller also adjusts the bias voltage through the bias control circuit 120.

In the preferred embodiment, the diode network 118 is implemented on a thermal electric cooler (TEC). As is known the temperature of the TEC is related to the electric current that flows through it. The temperature of the diode network 118 is controlled by adjusting the current with a temperature control circuit 122. A temperature sensor mounted near the diode network 118 is used by the temperature control circuit 122 to monitor the temperature of the diode network 118. Preferably, the temperature of the diode network is maintained at 40° C. If the temperature cannot be maintained within a range of 35 to 45° C., a light emitting diode (LED) signals the user of the transmitter 100 that performance may be degraded.

Figure 2:
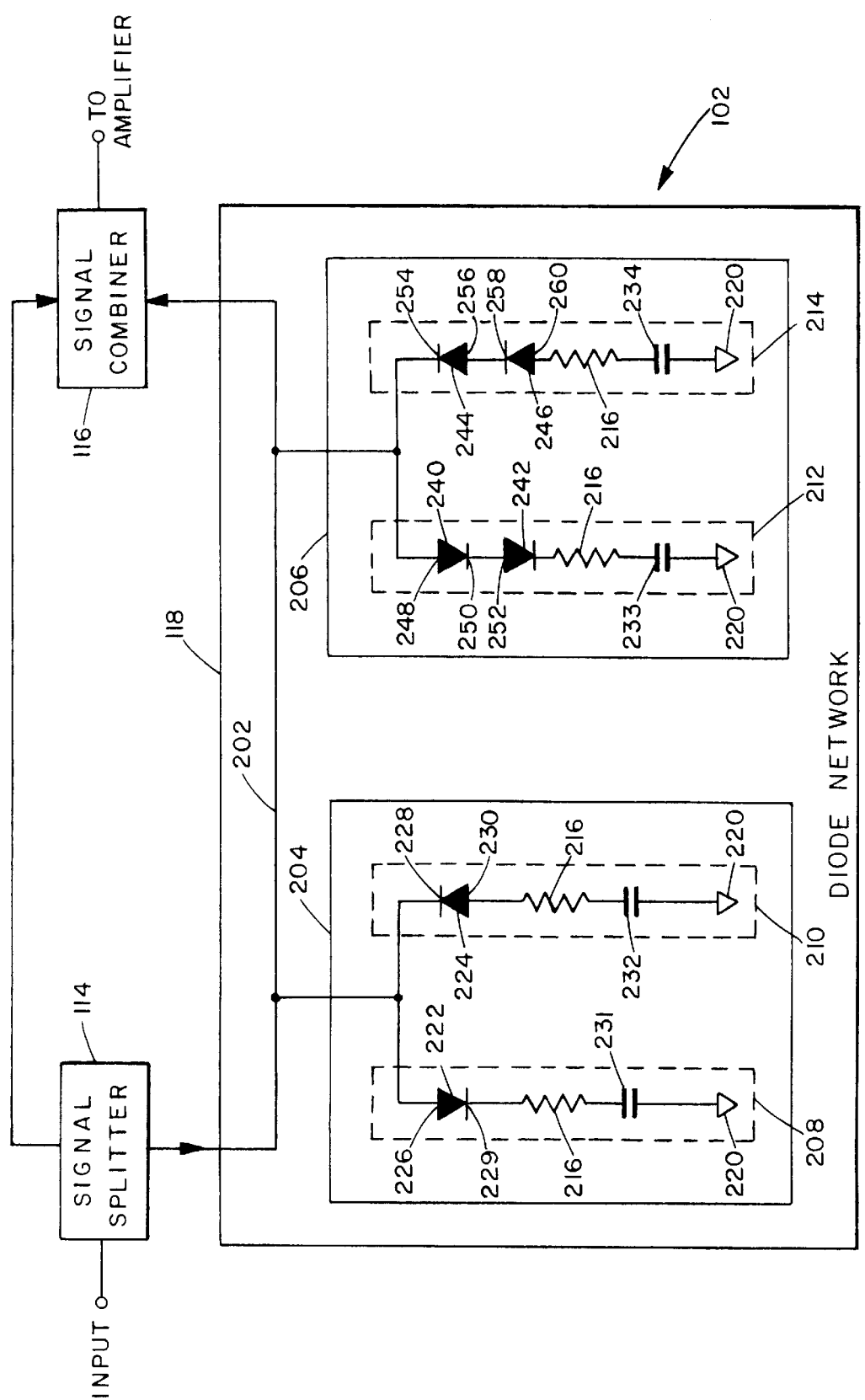
FIG. 2 is a block diagram of the predistortion circuit 102 in accordance with the preferred embodiment of the invention.

FIG. 2 is a block diagram of the predistortion circuit 102 in accordance with the preferred embodiment of the invention. As explained above, the signal splitter 114 divides the input RF signal into a first portion and second portion. The first portion of the input signal is received at a node 202 of the diode network 118 through a 3 dB attenuator (not shown). The diode network 118 includes a plurality of diode circuits 204–206. In the preferred embodiment, the diode network 118 includes two diode circuits 204, 206. The diode network 118, however, may contain more than two diode circuits 204, 206. Current limitations on phase and gain control of diode circuits make implementation of more than two diode circuits difficult. However, as tuning and alignment techniques are improved, greater reductions in nonlinear distortion may be achieved using more than two diode circuits.

Each of the diode circuits 204–206 contains two diode branches 208, 210, 212, 214. Each of the diode branches 208, 210, 212, 214 contains a resistor 216 and a capacitor 231–234 for coupling the diode branch 208 to an electrical ground 220. Each diode branch also contains an RF choke (not shown) through which the bias voltage is supplied to the diode branches 208, 210, 212, 214.

The diode branches 208, 210 in the first diode circuit 204 each include one diode 222, 224 in the preferred embodiment. The diodes 222, 224 are, preferably, medium-barrier Schottky diodes housed in a single package manufactured by the Metelics company. One of the diode branches 208 is connected to the node 202 through the anode 226 of a diode 222. The cathode 229 of the diode 222 is coupled to ground 220 through a capacitor 231. The other diode branch 210 is connected to the node 202 through the cathode 228 of another diode 224. The anode 230 of the other diode 224 is coupled to ground 220 through the capacitor 232.

In the preferred embodiment, the diode branches 212, 214 of the second diode circuit 206 include at least two diodes 240–246 in each branch 212, 214. However, the diode branches 212, 214 may contain any number of diodes depending on the particular transmitter 100 and electro-optic modulator 112. The diodes 240–246 in each branch are arranged in series. Preferably, the diodes 240–246 are also medium-barrier Schottky diodes housed in a single package. In one of the diode branches 212 of the second diode circuit 206, the anode 248 of one of the diodes 240 is connected to the node 202 and the cathode 250 is connected to the anode 252 of the other diode 242. The other diode 242 is coupled to ground 220 through a capacitor 233.

A diode 244 in the second branch 214 of the second diode circuit 206 is connected to the node 202 through the cathode 254 of the diode 244. The anode 256 of the diode 244 is connected to the cathode 258 of the other diode 246 in the second diode branch 214. The anode 260 of the other diode 246 is coupled to ground 220 through a capacitor 234. Therefore, the diode network 118 contains a plurality of diode circuit 204–206 where each diode circuit 204–206 includes at least two diode branches 208–214 to ground 220 (shunt elements). In the preferred embodiment, the diode branches 208, 210 of one diode circuit 204 include one diode 222, 224 each and the diode branches 212, 214 of the other diode circuit 206 include at least two diodes 240–246.

As explained above, during operation of the predistortion circuit, the input signal is split into two portions. One portion is attenuated by 3 dB, passed through the diode network 118 which has a sinusoidal transfer function, passed through another 3 dB attenuator and combined with the other portion of the input signal in the signal combiner 116 to produce a transfer function in accordance with an arcsine function.

By using at least two diode circuits 204, 206, linear operation of the electro-optic modulator 112 can be maintained over a greater range of input signal amplitudes. Multiple diode circuits allow for a more accurate approximation of an arcsine transfer function in the predistortion circuit 102 than in previous techniques.

Figure 4:
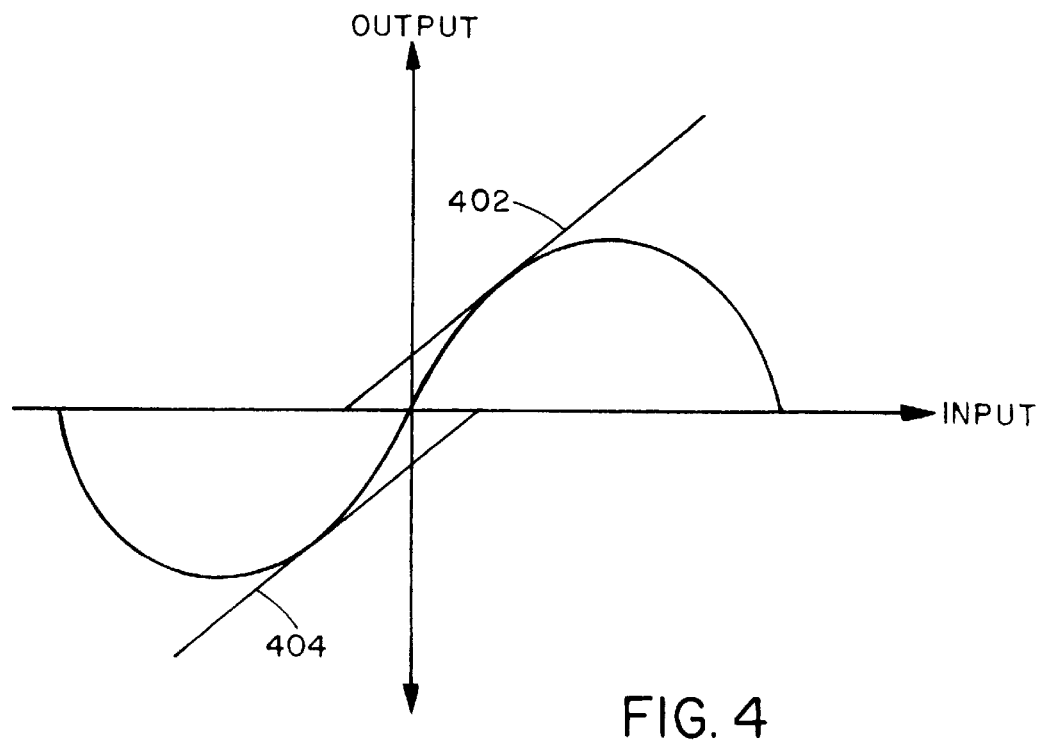
FIG. 4 is a graphical representation of a sinusoidal transfer function of the diode network in accordance with the preferred embodiment of the invention.

FIG. 4 is a graphical representation of the sinusoidal transfer function 400 of the diode network 118 in accordance with the preferred embodiment of the invention. As is seen in FIG. 4, the sinusoidal transfer function 400 has a slope 402 for positive values and slope for negative values of the input signal injected at the node 202. The shape of the transfer function 400 is determined by, among other factors, the configuration of the diode network 118 and the characteristics of the particular components of the diode network 118. The values of the resistors 216 effect the shape of the transfer function 400 and are determined experimentally to provide a transfer function 400 having a shape that closely approximates a sinusoidal response.

During operation of the predistortion circuit 102, the resistance in each diode branch 208–214 dynamically changes in relation to the level of the input signal. The resistance in each diode branch 208–214 is determined by the input signal amplitude. As is known, the relationship of the resistance of a diode to small signal voltages across the anode and the cathode is not linear but rather follows a portion of a sinusoidal function. The resistance in the first diode branch 208 decreases for a positive input signal levels within a certain range determined by the diode 222 characteristics and the resistor 116. The decrease in resistance results in a decrease in the slope 402 of the sinusoidal transfer function 400.

As the input signal amplitude become increasingly negative, the resistance of the other diode branch 210 in the first diode circuit 204 decreases. The reduced resistance for this range of negative input signal amplitudes results in an increase in the slope 404 of the sinusoidal transfer function 400.

The resistance in one of the diode branches 212 of the second diode circuit 206 decreases for a second range of positive input signal amplitudes. The slope 420, therefore, decreases for a second range of input signal values.

The slope 404 is increased for a second range of negative input signal amplitudes due to the resistance decreasing in the other diode branch 214 of the second diode circuit 206. Using multiple shunt elements 208–214, the sinusoidal transfer function 400 of the diode network 118 more accurately approximates a sinusoid and, therefore, allows for the transfer function of the predistortion circuit to closely approximate an arcsine function.

Figure 3:
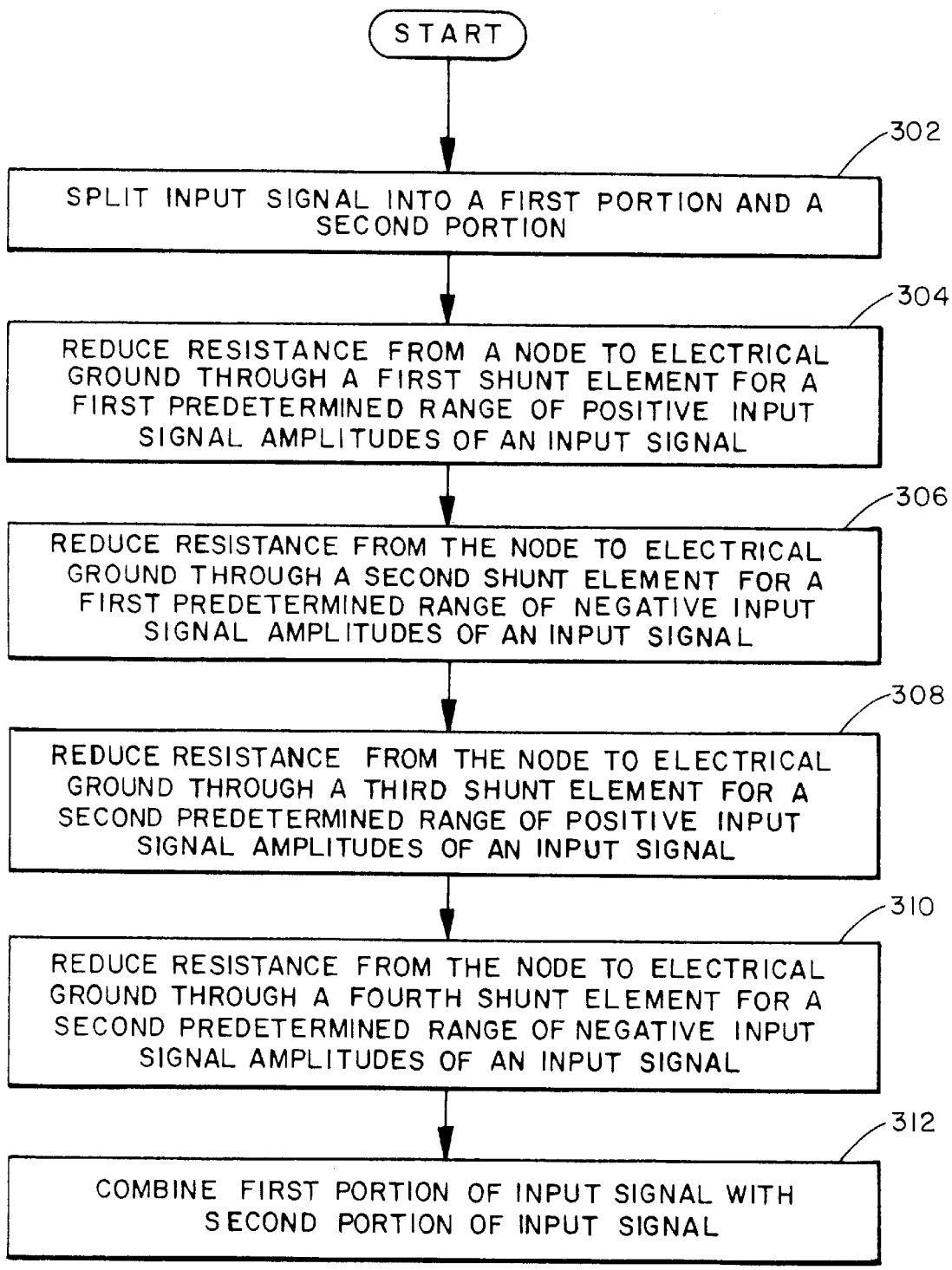
FIG. 3 is a flow chart of a method of predistorting an input signal to a nonlinear device.

FIG. 3 is flow chart of a method of reducing distortion in a nonlinear device in accordance with the preferred embodiment of the present invention. The method begins at step 302 where the input signal is split into a first portion and a second portion in the signal splitter 114.

At step 304, the resistance from the node 202 to the electrical ground 220 is reduced through a first shunt element 208 for a first predetermined range of positive input signal amplitudes of an input signal. In the preferred embodiment, the resistance of the diode branch (first shunt element) 208 having the diode 222 connected with the anode 226 to the node 202 decreases as the diode 222 begins to conduct for a first range of positive input signal values. As mentioned above, the relationship of the resistance of a diode to small signal voltages across the anode and the cathode is not linear but rather follows a portion of a sinusoidal function. Accordingly, in the preferred embodiment, the resistance of the first shunt element 208 is reduced nonlinearly and in accordance with a sine function for a first range of positive input signal amplitudes.

At step 306, the resistance from the node 202 to the electrical ground 220 is reduced through a second shunt element 210 for a first predetermined range of negative input signal amplitudes of an input signal. In the preferred embodiment, the resistance of the diode branch (second shunt element) 210 having the diode 224 connected with the cathode 228 to the node 202 decreases as the diode 222 begins to conduct for a first range of negative input signal values. Because of the small signal characteristics of the diode, the resistance is reduced in accordance with a sinusoidal function in the preferred embodiment.

At step 308, the resistance from the node 202 to the electrical ground 220 is reduced through a third shunt element for a second predetermined range of positive input signal amplitudes of an input signal. In the preferred embodiment, the resistance of the diode branch (third shunt element) 212 having the diode 240 connected with the anode 248 to the node 202 decreases as the diode 240 begins to conduct for a second range of positive input signal values. Since the third shunt element 212 contains two diodes 240, 242, the relationship of signal amplitude to resistance is different than the first shunt element 208.

At step 310, the resistance from the node 202 to the electrical ground 220 is reduced through a fourth shunt element for a second predetermined range of negative input signal amplitudes of an input signal. In the preferred embodiment, the resistance of the diode branch (fourth shunt element) 214 having the diode 244 connected with the cathode 254 to the node 202 decreases as the diode 244 begins to conduct for a second range of negative input signal values. Because of the small signal characteristics of the diode, the resistance is reduced in accordance with a sinusoidal function in the preferred embodiment. Since the fourth shunt element 214 contains two diodes 244, 246, the relationship of signal amplitude to resistance is different than the second shunt element 210.

Therefore, by performing steps 302–310, the first portion of the input signal is predistorted in accordance with a sinusoidal transfer function 400. The resistance in the shunt elements 208, 212 is decreased as the diodes 222, 240, 242 conduct current resulting in a decrease of the slope 402 of the sinusoidal transfer function 400 for two ranges of positive input signal amplitudes. The resistance of the other shunt elements 210, 214 is decreased as the diodes 224, 244, 246 conduct current resulting in an increase of the slope 404 of the sinusoidal transfer function 400 for two ranges of negative input signal amplitudes.

At step 312, the first portion of the input signal is combined with the second portion of the input signal in the signal combiner 116. As explained above in reference to FIG. 2, the first portion of the input signal is attenuated in order to combine the first and second portions of the input signal in the appropriate proportion to produce a transfer function in accordance with an arcsine function.

The previous descriptions of the preferred embodiment are provided to enable any person skilled in the art to use the present invention. Various modifications to these embodiments will be readily apparent to those skilled in the art, and the generic principles defined herein may be applied to other embodiments without the use of the inventive facility. Therefore, this invention is to be limited only by the following claims, which include all such other embodiments and modifications when viewed in conjunction with the above specification and accompanying drawings.

What is claimed is:

1. A method of applying a desired nonlinear transfer function to an input signal to compensate for undesired distortion of the input signal in a nonlinear device, the method comprising the steps of:
   splitting the input signal to a first input signal and a second input signal:
   producing a first output signal by applying a sinusoidal transfer function to the first input signal, comprising the steps of:
      applying the first input signal to a predistortion circuit that approximates a sinusoidal transfer function, the predistortion circuit having a resistance from a node to an electrical ground through a plurality of shunt elements, wherein each shunt element of the plurality of shunt elements comprises a diode connected in series with a resistive element and a capacitive element to the electrical ground;
      reducing the resistance from the node to electrical ground through a first shunt element of the plurality of shunt elements for a first predetermined range of positive input signal amplitudes of the input signal;
      reducing the resistance from the node to electrical ground through a second shunt element of the plurality of shunt elements for a first predetermined range of negative input signal amplitudes of the input signal;
      reducing the resistance from the node to electrical ground through a third shunt element of the plurality of shunt elements for a second predetermined range of positive input signal amplitudes of the input signal; and
      reducing the resistance from the node to electrical ground through a fourth shunt element of the plurality of shunt elements for a second predetermined range of negative input signal amplitudes of the input signal;
      wherein the steps of reducing the resistance to electrical ground produces the sinusoidal transfer functions and
   combining the first output signal with a multiple of the second input signal to approximate the desired nonlinear transfer function.

2. The method of claim 1, wherein the desired nonlinear transfer function is an arcsine transfer function.

3. A method of applying a sinusoidal transfer function to a first signal of a first signal path to provide a sinusoidal signal input to a circuit having a transfer function in accordance with an arcsine function to compensate for undesired distortion of the first signal resulting in a nonlinear device, the method comprising the steps of:
   connecting a circuit to the first signal path at a node, the circuit having a plurality of shunt elements connected to the node, wherein each shunt element of the plurality of shunt elements comprises a diode connected in series with a resistive element and a capacitive element to an electrical ground;
   applying the first signal to the first signal path to produce the sinusoidal signal input: and
   adjusting at least one characteristic of the sinusoidal signal input. comprising the steps of:
      reducing the resistance to electrical ground through a first shunt element of the plurality of shunt elements for a first predetermined range of positive input signal amplitudes to produce a decreasing positive slope of the sinusoidal signal input,
      reducing the resistance to electrical ground through a second shunt element of the plurality of shunt elements for a first predetermined range of negative input signal amplitudes to produce an increasing positive slope of the sinusoidal signal input,
      reducing the resistance to electrical ground through a third shunt element of the plurality of shunt elements for a second predetermined range of positive input signal amplitudes to reduce the positive slope of the sinusoidal signal input,
      reducing the resistance to electrical ground through a fourth shunt element of the plurality of shunt elements for a second predetermined range of negative input signal amplitudes to increase the positive slope of the sinusoidal signal input.

4. A predistortion circuit for producing a nonlinear signal to compensate for undesired distortion of a nonlinear device, the predistortion circuit comprising:

a signal splitter adapted to produce a first portion of an input signal at a first output of the signal splitter and a second portion of the input signal at a second output of the signal splitter;

a diode network for applying a sinusoidal transfer function to the first portion of the input signal, the diode network having a node coupled to the first output of the signal splitter, the diode network comprising:

a plurality of diode circuits connected at the node, each diode circuit of the plurality of diode circuits providing a connection from the node to a common ground; each diode circuit comprising a first diode branch for approximating a first portion of the transfer function for positive values of the first portion of the input signal, the first diode branch comprising a first diode having a first diode anode connected to the node and a first diode cathode coupled to the common ground through a first resistor and a first capacitor; and a second diode branch for approximating a second portion of the transfer function for negative values of the first portion of the input signal, the second diode branch comprising a second diode having a second diode cathode connected to the node and a second diode anode coupled to the common ground through a second resistor and a second capacitor; and a signal combiner having combiner inputs comprising the second output of the signal splitter and the node of the diode network, the nonlinear signal resulting at the output of the signal combiner.

5. The predistortion circuit of claim 4, wherein each of the first and second diodes of at least one diode circuit of the plurality of diode circuits comprises a plurality of diodes arranged in series.

6. The predistortion circuit of claim 5, wherein the plurality of diodes arranged in series comprises a first series diode and a second series diode, and wherein the cathode of one of the first series diode and the second series diode is connected to the anode of the other of the first series diode and the second series diode.

7. The predistortion circuit of claim 4, wherein the nonlinear signal at the output of the signal combiner of the predistortion circuit is the arcsine transfer function of the combiner inputs.

8. A diode network for providing sinusoidal distortion of an input signal on a signal path, the diode network comprising:

a first and second diode circuit connecting a node of the signal path to an electrical ground, each of the first and second diode circuits comprising:

a first branch for producing the sinusoidal distortion for positive values of the input signal, the first branch comprising:

a first branch diode connected to the node through an anode of a first branch diode;

a first resistor connected to a cathode of the first branch diode;

a first capacitor connected to the first resistor and to the electrical ground; and a second branch for producing the sinusoidal distortion for negative values of the input signal, the second branch comprising:

a second branch diode connected to the node through a cathode of a second branch diode;

a second resistor connected to an anode of the second branch diode;

a second capacitor connected to the second resistor and to the electrical ground.

9. The diode network of claim 8, further comprising a third and forth branch, wherein each of the third and forth branch comprises at least two diodes connected in series, the third and forth branch for producing further sinusoidal distortion of the positive and negative values of the input signal.

10. A diode network connected to a node, the diode network for applying a sinusoidal transfer function to a signal on the node, the diode network comprising:

a first diode circuit connected to the node comprising a first diode branch connected in parallel to a second diode branch, the first diode branch having an anode of a first diode connected to a cathode of a second diode at the node, and wherein the first diode is connected in series with a first resistive element and a first capacitive element to the electrical ground and the second diode is connected in series with a second resistive element and a second capacitive element to the electrical ground, the first diode circuit for producing a sinusoidal distortion of a first range of positive and negative values of the signal; and a second diode circuit comprising a third diode branch connected in parallel to a fourth diode branch, the third diode branch having an anode of a third diode connected to a cathode of a forth diode at the node, and wherein the third diode is connected in series with a third resistive element and a third capacitive element to the electrical ground and the fourth diode is connected in series with a fourth resistive element and a fourth capacitive element to the electrical ground, the second diode circuit for producing a sinusoidal distortion of a second range of positive and negative values of the signal.

11. The diode network of claim 10, wherein the second diode circuit further comprises:

a fifth diode having an anode coupled to a cathode of the third diode; and a sixth diode having a cathode coupled to an anode of the fourth diode.

12. The diode network of claim 10, wherein the third and fourth capacitive elements comprise a plurality of capacitors.

* * * * *